Patented Oct. 18, 1938

2,133,690

UNITED STATES PATENT OFFICE 2,133,690

RUBBER AND METHOD OF MAKING THE SAME

Albert K. Epstein and Benjamin R. Harris, Chicago, Ill.; said Epstein assignor to said Harris No Drawing. Application January 28, 1935, Serial No. 3,802. Renewed March 8, 1937

12 Claims. (Cl. 18—50)

Our invention relates to an improved rubber product and process of producing the same.

The principal object of the invention is the production of an improved rubber composition.

Another object is the provision of an improved method for producing rubber articles, particularly in the milling and mixing of the rubber magma.

Another object is to avoid difficulties encountered heretofore in the preparation of rubber goods.

Other objects are to cut down the milling time, to produce a better rubber product, to introduce greater proportions of reclaimed rubber or old rubber scrap, or discards, trimmings, and a relatively smaller proportion of new rubber crepe without sacrificing quality, and to obtain more uniform distribution of fillers and similar substances throughout the rubber mass.

Other objects and advantages of the invention will appear from the detailed description.

Generally speaking, our process is applicable to the manufacture of rubber materials and rubber articles made from any type of rubber mix employing rubber. It has an advantage, however, in rubber mixes of the type wherein raw rubber such as crepe rubber is mixed with old rubber, fillers, coloring matter and the like. Our process is applicable also in the production of rubber articles manufactured from latex, wherein the addition substances described later act as dispersing agents, and our process is also applicable in rubber cements and in rubber solutions in organic solvents used for spreading on cloth.

Our process and product utilize certain addition agents, the nature of which will be pointed out hereinafter, by the proper use of which great advantages are secured and the objects of the invention attained.

The addition agents which we employ are organic substances which contain at least one lipophile group of relatively high molecular weight and at least one hydrophile group of a class consisting of oxygenated inorganic acid radicals including sulphates and sulphonic acid, sulpho fatty acid, phosphonic, and phosphoric acid radicals. These substances may be sulphuric or phosphoric acid esters of relatively high molecular weight alcohols, which may be neutralized with mineral bases or ammonia to form alkaline salts, or they may be neutralized with amines such as relatively low molecular weight alkylol amines. Among the substances of this class are cetyl sodium sulphate, cetyl ammonium sulphate, the basic salts of oleyl sulphate, lauryl sulphate, and other sulphates of high molecular weight alcohols, or corresponding phosphates (salts) of relatively high molecular weight alcohols, their alkali salts or their amine salts such as alkylol amine salts including the mono-, di- or triethanolamine salts and the like. Equivalent sulphonic acid or phosphonic acid derivatives may also be used such as cetyl sulphonic acid, lauryl sulphonic acid and the like, suitably neutralized, or the basic salts of a mixture of the sulphate, sulphonic, or phosphoric acid esters of a mixture of high molecular weight alcohols.

In place of the alkaline esters of relatively high molecular weight alcohols, we may employ high molecular weight aliphatic, aromatic, cycloaromatic derivatives of polyhydroxy substances having at least one relatively high molecular weight lipophile group in the molecule and at least one hydroxy group esterified with an oxygenated inorganic acid of the character described. The derivatives of the polyhydroxy substances may be relatively high molecular weight fatty acid esters or ethers of polyhydroxy substances such as glycerine, glycols, or poly-compounds thereof such as polyglycerols, diethylene glycol, sugars, sugar alcohols such as mannitol and sorbitol and the like. Examples of this type of material are a mixture of cocoanut fatty acid esters of diethylene glycol in which one hydroxy group of the diethylene glycol is esterified with sulphuric acid or phosphoric acid neutralized to form the alkali or amine salts thereof such, for example, as the ammonium or ethanol amine salts; mono-stearine sulphate (alkaline salt) and cottonseed oil fatty acid esters of glycerine wherein at least one hydroxy group of the glycerine is esterified with sulphuric acid and neutralized; cetyl alcohol ether of ethylene glycol sulphate (alkaline salt) or mixtures of lauryl and myristyl alcohol ethers of glycerol sulphate neutralized with ethanol amine and other amines, or naphthenic acid ester of glycerine sulphate (salt).

As addition agents coming within the broad classification outlined, we may also use sulphofatty acid esters of relatively high molecular weight alcohols in the form of their respective salts. Examples of this class of substance are sulphoacetate and sulphobutyrate esters of cetyl or lauryl alcohol or mixtures of alcohols (alkaline salts). We may also employ relatively high molecular weight fatty acid esters of polyhydroxy substances such as glycerine, sugar, sugar alcohols, glycols, di-ethyleneglycol or other polyglycols, polyglycerols, and the like, in which one of the hydroxy groups of the polyhydroxy substance is esterified with a sulpho-fatty acid of relatively lower molecular weight. Thus, for example, we may use mono-stearine sodium sulphoacetate or mono-olein sulphoacetate (alkali salt) or the sulphoacetate esters of monolaurin (alkali salts) or the sulphoacetate esters of a mixture of high molecular weight monoglycerides (alkali salts).

In the preparation of substances for use with the present invention, it is not necessary to carry on the processes so that pure substances are produced. Not only can we use mixtures of the various substances noted, but very often mixtures seem to produce somewhat better results than the pure substances. For example, instead of preparing relatively pure fatty acids, we may use various mixtures of fatty acids derived from vegetable and animal oils and fats, such as peanut oil, cottonseed oil, corn oil, sesame oil, lard, oleo oil, cocoanut oil, fish oils of various types, such as sardine oil, cod liver oil, naphthenic acids and the like; the mixture of fatty acids being esterified with a polyhydroxy substance, for example, glycerine, glycols or polycompounds thereof, to produce a mixture of esters having free hydroxy groups. These esters are then esterified with sulphuric or phosphoric acid or treated otherwise to produce an ester of sulphuric acid or treated to produce a sulphonic, phosphoric or phosphonic acid substitution product at one or more free hydroxy groups to produce the mono- or di-sulphate, or mono- or di-sulphonic acid or the mono- or di-phosphate. These substances are then preferably neutralized with an alkaline material such as sodium or potassium hydroxide, ammonia, or a suitable amine such as mono-, di-, or triethanolamine. Other amines such as methyl amine, ethyl amine, trimethyl amine, benzyl amine, propyl amine, amyl amine and others may be used.

We may also employ mixtures of alcohols prepared by the catalytic reduction of the corresponding fatty acids mentioned and then by treating the mixture of alcohols with sulphuric acid or other sulphating agents, or $P_2O_5$ to produce a mixture of alkyl sulphates or alkyl phosphates of the type hereinbefore referred to. These alkyl sulphates or phosphates are then neutralized with a suitable alkaline material of the general class previously discussed.

We may produce mixtures of our substances by direct re-esterification of a suitable oil or fat which may be of animal or vegetable origin. For example, we may re-esterify fish oil with glycerine or with polyglycerols to produce a mixture of esters having at least one free hydroxy group and then treat the reaction mixture with a suitable sulphating or sulfonating agent such as sulphuric acid or sulphonic acid and the like under proper conditions of time and temperature to produce either the mono- or di-sulphate ester or other sulpho derivative of the mixture of various substances. This mono- or di-sulphate mixture is neutralized with a suitable base, the amount employed being calculated on the basis of the amount of sulphonating agent employed. In place of forming the sulphuric acid ester, we can take a suitable oil or fat re-esterified with glycerine or polyglycerol and react the same with chloracetic acid and then with sodium sulphite, for example, under suitable conditions to produce a sodium sulphoacetate in which at least one or more hydroxy groups of the polyhydroxy substance, such as glycerine or polyglycerol, are replaced by the sulphoacetate radical. In general this may also be accomplished by esterifying with preformed sulphoacetic acid.

In the case of our phosphoric acid compounds used as improving agents in our rubber mixes as plasticizers and dispersing agents, we may take the soft or hard single or mixed high molecular weight fatty acid esters of a polyhydroxy substance such as glycols, in which only one OH has been esterified, or the high molecular weight fatty acids of glycerine or polyglycerol in which one and/or two or more OH groups have been esterified but which still contains free OH groups and react same under suitable temperatures with suitable amount of $P_2O_5$ to produce the phosphoric ester derivative and neutralize the acid with, for example, suitable sodium salts, ammonia, or an amine of the type enumerated above.

When a mixture of various fatty acid esters of the polyhydroxy substance having at least one free hydroxy group is treated to form the sulphate or sulphonic acid or sulpho-fatty acid or phosphoric acid derivative in the manner pointed out in the previous paragraph, it is not essential that all of the esters present in the mixture have at least one hydroxy group esterified with a sulphate radical or substituted by a sulphonic acid or phosphoric acid radical. A considerable amount of the intermediate mono- or di-ester with free OH groups may be allowed to remain without materially affecting the suitability of the product for use in a rubber mix. Indeed, the fatty acid esters having free unesterified hydroxy groups themselves have an effect when employed as addition agents in rubber not dissimilar to the effect imparted to the rubber by the use of the sulphate, phosphate, sulphonic and sulpho-acetate and the like substances described herein. For many purposes, a mixture of esters having free hydroxy groups and esters in which the hydroxy groups are esterified with or replaced by an oxygenated inorganic acid radical of sulphur or phosphorous produce better results than either one of these substances mentioned when used alone.

As an example of the manner in which our invention is carried out, we take, for example, a small amount of an oily liquid composed essentially of the sulphated mono-ester of cocoanut oil fatty acids and diethylene glycol neutralized with ethanolamine and introduce the same into crepe rubber and mill the same until a plastic master mass is produced, to portions of which rubber scrap, trimmings, fillers and the like may be added to produce the final rubber product. We may also introduce a small amount of the same addition product, about 6 oz. into a batch consisting of 25 pounds of milled crepe rubber and (added to the same during milling) about 60 pounds of rubber scraps such as trimmings, cuttings, old rubber, and the like, and about 15 pounds of a suitable clay filler, antioxidants, accelerators, coloring matter, until a plastic mass is obtained. When this plastic mass has been produced, it is calendered in the usual manner to produce sheets and vulcanized with sulphur chloride vapor to produce a rubber composition from which various types of articles can be made. Sulphur may be added to the mix in the usual amount and the rubber mix vulcanized in the usual manner. Molded articles may be thus produced. This method of mixing and the general formula are illustrative because our addition substances may be used to advantage with substantially any type of rubber mix made and used commercially.

We have discovered that by using small amounts of the substances of our invention, say between three and eight ounces thereof for every hundred pounds of rubber product, a considerable amount of improvement is obtained and a greater amount of rubber trimmings may be used in proportion to new rubber without deleteriously affecting the character of the final vulcanized product. When the substances of our invention are employed for making sheet rubber, the vulcanized sheet product has less pin holes than the same product produced without our addition substances. The finished sheet has a certain softness and fullness to the feel. This effect takes place apparently because the rubber mass incorporates less air when our substances are used or milled and a better contact is made between each particle of filler and old rubber with the general rubber magma, thus preventing an excess of adsorbed air at the particles of rubber.

Our addition agents also have an interface modifying function when used in a rubber mix and they facilitate the dispersion of coloring matter, pigments, anti-oxidants, and other substances used in the rubber mix. They improve the calendering and milling, and increase the snap, feel, softness and resiliency of the rubber product. Stearic acid which is used in certain rubber formulae in large percentages may be partially or entirely eliminated. Those of our substances which are neutralized with ammonia and amines also act as accelerators and on account of their lipophile group are in contact with the rubber; thus a portion of other accelerators may be eliminated.

By our invention, a certain saving is obtained in new rubber in a rubber batch, even though the addition agent is employed in proportions as small as four to six ounces of addition agent per one hundred pounds of rubber. As an example, if a batch is milled containing ten pounds of master rubber (50% new rubber and 50% zinc oxide), and five pounds of clay, then about 75 pounds of scrap such as trimmings and the like may be added with an additional ten pounds of new rubber to produce a milled product containing other addition agents (antioxidant, accelerator, etc.) which may afterward be calendered into rubber sheeting. With this particular character of formula, cocoanut fatty acid mono esters of di-ethylene glycol sulphate (neutralized with an alkylolamine) produce unusually good results. If our addition agent is omitted in the example given, then approximately forty pounds of additional new rubber must be used to obtain comparable results. The use of the addition agent results in the production of a product characterized by a soft feel and desirable fullness. When clay is used as a filler, our addition agents obviate the rattling of the final rubber sheets and reduce pin holes. When the particular rubber mix product is rolled, they also facilitate sticking of the rubber in cutting and joining two sheets together.

Another type of product with which we have had unusually good results is a product produced by re-esterifying fish oils to produce a mixture of mono- and di-glycerides, then sulphonating the resulting product at a low temperature to sulphonate the hydroxy group, and then neutralizing with ammonia gas. With this type of material, we can produce valuable commercial products in which only twenty parts of new rubber are employed for one hundred pounds of final product, the balance comprising scrap or reclaimed rubber such as rubber cuttings, trimmings and the like.

Many of the substances which we employ in our present invention reduce appreciably the spattering of margarine during frying when said margarine is an emulsion of the usual oleaginous material with milk. In such substances a state of "balance" exists between the lipophile and hydrophile portion of the molecule. For many purposes, and particularly in certain types of rubber mix, these anti-spattering substances exhibit properties of unusual value, and are in general preferred over other substances which will not function potently as anti-spattering agents.

We may represent a large class of our substances by the general formula $R_v$—$X_{n-1}$—$Y_w$ wherein "R" is a lipophile alkyl, or acyl radical with at least 8 carbon atoms, "X" is the residue of a polyhydroxy substance, "Y" is a neutralized oxygenated inorganic acid radical, and "$v$", "$n$" and "$w$" are relatively small integers.

We employ the term "rubber" in the claims to include natural and synthetic rubber, gutta percha, balata and the like. The term "filler" is used in a broad sense to include not only substances which have the sole function of fillers, such as clay and carbon black, but also such substances as those which may also have another function, for example, to impart color.

We have described our invention somewhat in detail to permit those skilled in the art to practice the same, and have indicated preferred embodiments and outstanding advantages from the use of our products. Many other specific products besides those specifically mentioned and given by way of example can be employed with good results, and many advantages are obtainable both in the manufacture and character of the final rubber product. The advantages particularly described are obtained in substantially all types of rubber manufacture, but it will be understood that special advantages often are obtained when special types of rubber mixes are used. We therefore do not limit our invention, except within the scope of the appended claims.

What we claim as new and desire to protect by Letters Patent of the United States is:

1. A rubber composition including rubber and a relatively small proportion of an aliphatic chemical compound having at least one relatively high molecular weight alkyl or acyl group and at least one group of a class consisting of sulphate, sulphonic and sulpho-fatty acid radicals, and wherein the sulphate, sulphonic or sulpho-fatty acid radical is neutralized with an organic nitrogenous base of the class consisting of amines and alkylolamines, said compound being free of aromatic substituents.

2. A rubber composition including rubber and a relatively small proportion of an improving agent in the form of a substance having the general formula $$R_v—X_{n-1}—Y_w$$

wherein "R—" is an alkyl or acyl radical with at least twelve carbon atoms, "—X—" is the residue of an aliphatic polyhydroxy substance, "—Y" is a neutralized oxygenated acid radical containing sulfur or phosphorous, and "$v$", "$n$" and "$w$" are relatively small integers.

3. A rubber composition including rubber and a relatively small proportion of an improving agent in the form of a substance having the general formula $$R_v—X_{n-1}—Y_w$$

wherein "R—" is an alkyl or acyl radical with at least eight carbon atoms, "—X—" is the residue of an aliphatic polyhydroxy substance, "—Y" is at least a partially neutralized oxygenated phosphorus, sulphonic, or sulpho-fatty acid radical, and "v", "n" and "w" are relatively small integers.

4. A rubber composition including rubber and a relatively small proportion of an improving agent in the form of a relatively high molecular weight aliphatic alcohol, the hydrogen of the hydroxy group of which is replaced by at least a partially neutralized sulphate, sulphonic or sulpho-fatty acid radical.

5. A rubber composition including rubber and a relatively small proportion of an improving agent in the form of a relatively high molecular weight ester of glycol wherein the hydrogen of one hydroxy group of the glycol is replaced by at least a partially neutralized oxygenated phosphorus, sulphonic, or sulpho-fatty acid radical.

6. The method of improving a rubber composition which comprises milling into said rubber composition a relatively small proportion of an addition substance having the general formula

wherein "R—" is an alkyl or acyl radical with at least eight carbon atoms, "—X—" is the residue of an aliphatic polyhydroxy substance, "—Y" is at least a partially neutralized oxygenated acid radical containing sulfur or phosphorus, and "v", "n" and "w" are relatively small integers.

7. A rubber composition including rubber and a relatively small proportion of an improving agent in the form of a relatively high molecular weight aliphatic alcohol, the hydrogen of the hydroxy group of which is replaced by a phosphatic or phosphoric acid radical which is at least partially neutralized.

8. A rubber composition including rubber and a relatively small proportion of an improving agent in the form of a higher fatty acid ester of an aliphatic polyhydroxy substance wherein the hydrogen of at least one hydroxy group of the polyhydroxy substance is replaced by at least a partially neutralized oxygenated inorganic acid radical containing sulphur or phosphorus.

9. A rubber composition including rubber and a relatively small proportion of an improving agent in the form of a derivative of an aliphatic polyhydroxy substance wherein the hydrogen of at least one hydroxy group of the polyhydroxy substance is replaced by an acyl group with at least eight carbon atoms, and the hydrogen of at least one hydroxy group is replaced by at least a partially neutralized oxygenated phosphorus, sulphonic, or sulpho-fatty acid radical.

10. A rubber composition including rubber and a relatively small proportion of an improving agent in the form of a relatively high molecular weight ester of glycerin wherein the hydrogen of at least one hydroxy group of the glycerin is replaced by at least a partially neutralized oxygenated phosphorus, sulphonic or sulpho-fatty acid radical.

11. A rubber composition including rubber and a relatively small proportion of an improving agent in the form of a chemical compound having the general formula

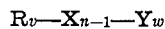

wherein R is a relatively high molecular weight alkyl or acyl radical, —X— is the residue of a polyhydroxy substance of the class consisting of glycerine, glycols, polyglycerols, polyglycols, sugars, and sugar alcohols, —Y is at least a partially neutralized oxygenated acid radical and $v$, $n$ and $w$ are relatively small integers.

12. A rubber composition including rubber and a relatively small proportion of an aliphatic chemical compound having at least one relatively high molecular weight alkyl or acyl group and at least one group of a class consisting of sulphate, sulphonic and sulpho-fatty acid radicals, and wherein the sulphate, sulphonic or sulpho-fatty acid radical is neutralized, at least in part, said compound being free of aromatic substituents.

ALBERT K. EPSTEIN.
BENJAMIN R. HARRIS.